Oct. 8, 1940.                    W. F. STEWART                    2,217,144
                                 CHURN AND BEATER
                                Filed Oct. 15, 1938
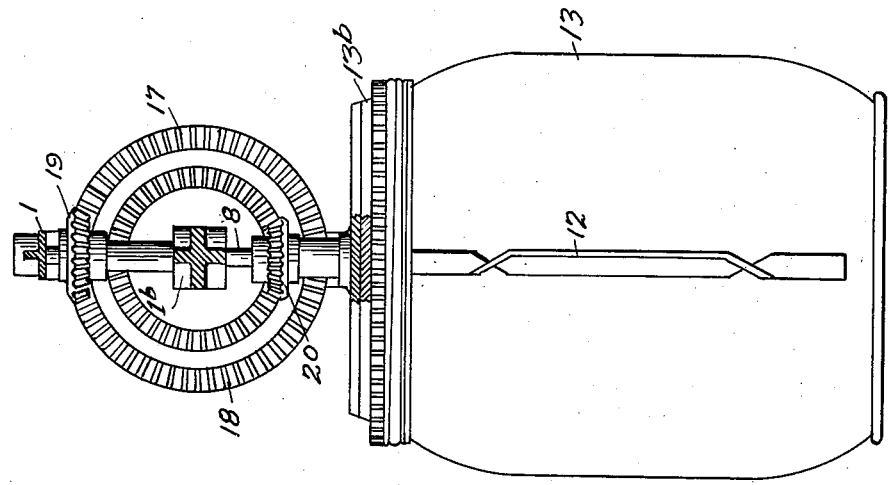
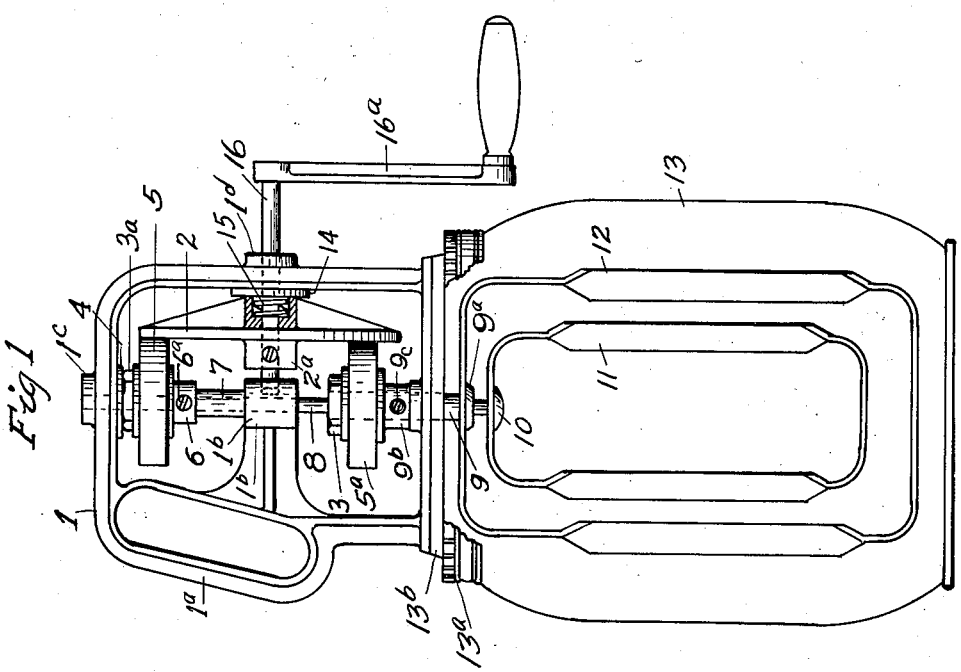
INVENTOR.
William F. Stewart,
BY Bush & Bush
ATTORNEYS.

Patented Oct. 8, 1940

2,217,144

UNITED STATES PATENT OFFICE 2,217,144

CHURN AND BEATER

William F. Stewart, Quincy, Ill.

Application October 15, 1938, Serial No. 235,136

3 Claims. (Cl. 74—195)

My improvement relates primarily to churns of the type which may be utilized also for whipping cream, beating eggs, salad dressings, and various other fluid and semi-fluid mixtures.

The objects of my invention are to provide means applicable to churns and similar devices having inner and outer dashes, by which the inner dash may be rotated at a higher speed of rotation than the outer dash so that the actual rate of travel of the blades of the inner dash may be made equal to or greater than the rate of travel of the outer dash, thus considerably increasing the effectiveness of the appliance whether used for churning, egg beating, cream whipping, or otherwise.

I accomplish these objects by the apparatus shown in the accompanying drawing, in which, Figure 1 shows a vertical side elevation with part of the cap broken away, and Figure 2 shows a vertical elevation of a front view with a part of the frame and cap broken away for clearness of illustration, but illustrating an alternative form in which gears are used in place of the friction drive.

Similar numerals refer to similar parts in both views.

My apparatus comprises a container 13 which may be of glass, tin, or other suitable material and of any desired size. A one quart glass bottle will be preferable for many household uses and a one gallon container will be convenient for churning small batches of cream to make butter. Larger size containers may be used for larger batches of cream, it only being necessary to increase the size of the parts approximately of the same relative proportions.

Upon the container 13 is secured a cap 13a having united thereto a base-plate 13b. The base-plate 13b may be formed integral with a frame 1 preferably T-shaped in section and including a handle 1a at the upper part thereof and extending upwardly at right angles to the base-plate.

Revolvably mounted in the frame 1 and extending through the base-plate 13b and cap 13a, is a shaft 8 the lower end of which is formed with a head 10 which is preferably soldered, brazed or welded to a rectangular dash having blades 11 formed at the opposite sides thereof.

Upon the lower end of the shaft 8 is fitted a sleeve 9 having a flange 9a formed thereon, which flange is soldered, brazed or welded to an outer rectangular dash having blades 12 at opposite sides thereof.

Upon the sleeve 9 is mounted a hub 9b which may be rigidly secured in place upon the sleeve 9 by a set screw 9c or other suitable means. Integral with the hub is formed a friction wheel 5a and a nut 3 may be threaded upon the shaft to secure the hub 9b and wheel 5a in place.

Upon the upper end of the shaft 8 I mount a hub 6 carrying a friction wheel 5 which may be secured in place by a set screw 6a. A spacer 7 is mounted upon the shaft 8 above the central portion of the frame 1 which is formed into a boss 1b to form a bearing for the middle of the shaft 8.

The nut 3a may be threaded upon the shaft above the hub 6 to secure the wheel 5 in place upon the shaft 8 and a washer 4 may be mounted upon the shaft 8 between the hub and a bearing 1c formed integral with the frame 1.

As the hubs 6 and 9b are secured in place upon the shaft 8 and the sleeve 9 respectively by the set screws 6a and 9c with adjusting nuts to lock them, it is obvious that the drums 5 and 5a carried by such hubs may be adjusted vertically so as to contact the friction drive 2 at various distances from its center, thereby varying the relative speed of rotation of the drums 5 and 5a, and likewise varying the rate of revolution of the dashes 11 and 12 within the limits permitted by the size of the structures.

A boss 1d is formed integral with the frame opposite the handle 1a and forms a bearing for a crankshaft 16 upon which a crank 16a is secured. The inner end of the crankshaft 16 is slidably mounted in a bearing formed in the hub 1b and sufficient space is left between the hub 2a and the boss 1b to allow a limited longitudinal travel of the crankshaft 16 for purposes of adjustment.

A friction disc 2 formed integral with the hub 2a, is mounted upon the crankshaft 16 and may be secured in place by a set screw or other suitable means, and a washer 14 is mounted upon the crankshaft interposed between the hub 2a and the frame.

In Figure 1 I have shown a part of the hub 2a in section to show the coiled compression spring 15 which is seated in a suitable bore in the hub 2a and one end of it bears against the hub 2a and the other end against the washer 14 so as to exert a constant pressure upon the friction disc 2 in the direction of the friction wheels 5 and 5a.

It is obvious that when so constructed, when the crank 16a is turned, it will revolve the crankshaft 16 and the friction disc 2. The pressure of the disc 2 upon the friction wheels 5 and 5a will then cause those wheels to revolve, the friction wheel 5 revolving the shaft 8 and the inner dash 11 and the friction wheel 5a will carry with it the sleeve 9 and the outer dash 12.

The friction wheel 5a is mounted nearer the axis of the crankshaft 16 than the fiction wheel 5 so that the circular line of contact of the friction disc 2 with the wheel 5 will have a greater radius and therefore be correspondingly longer than the circular line of contact of the face of the friction disc 2 with the friction wheel 5a. The wheels 5 and 5a being formed of the same diameter will have peripheries of equal length. Therefore, the wheel 5 will travel faster than the wheel 5a and the dash 11 accordingly will be driven faster than the dash 12. The variation in the speed of the dashes will be proportional to the variation in the distances of the wheels 5 and 5a from the axis of the crankshaft 16 and the variation may be adjusted by loosening the set screw 9c and moving the wheel 5a upwardly upon the sleeve 9 so as to reduce its distance from the axis of the crankshaft 16.

The drive surfaces of the friction disc 2 and the peripheries of the wheels 5 and 5a, may be formed of metal, wood, cork, rubber or any of the other well-known materials utilized in friction drives, but I prefer to use a metal disc and to form the wheels 5 and 5a of a resilient substance such as a mixture of rubber with other hardening substances or at least to face the wheels with a facing of such material and the wheels may be made of canvas or other fabric impregnated with rubber.

One advantage of this form of machine is that in action it will be practically noiseless and any wear will be taken up by the spring 15.

In Figure 2 I have shown an alternative form in which bevel gears are substituted for the friction drive of Figure 1. Such a form does not permit the ready adjustment previously described and there is likely to be sufficient wear or breakage of the teeth to cause slippage and impair the action of the apparatus. Likewise, the gear wheels are more likely to be noisy and cannot be made to operate as silently as the friction drive.

I am aware that churns have heretofore been made having inner and outer dashes driven by beveled gears, but in such machines heretofore made, the inner and outer dashes were arranged to turn with the same number of revolutions per minute so that the travel of the blades of the inner dash being in a shorter circle than the travel of the outer blades, was necessarily slower in feet or inches per second than the travel of the blades of the outer dash.

In my apparatus I have provided means by which the rotation of the inner dash may be speeded up so that it will travel at the same or even at a greater speed in inches per second than the outer dash, and thus increase the rate of movement of the cream, egg or other mixture from the center outwardly to the outer dash and thus give a higher degree of agitation and a quicker operation for either churning or whipping cream, eggs, salad dressings, etc.

In addition to this increased speed in producing results, my apparatus as shown in its preferred form in Figure 1, will avoid all chatter and noise of gears, etc.

Some modifications of my apparatus may be made without departing from the principle thereof and I do not limit my claims to the precise forms shown in the drawing.

I claim:

1. In a driving mechanism for churns, the combination with a support, of a frame united to the support extending upwardly therefrom, a pair of concentric drive shafts mounted upon the support and frame one within the other, friction wheels mounted respectively upon the inner and outer drive shafts on opposite sides of and at different distances from the axis of the crank shaft, a crank shaft mounted in the frame at right angles to the drive shaft, a friction disc mounted upon the crank shaft to bear against the peripheries of the friction wheels, and means for separately and independently adjusting the relative spacing of the friction wheels from the center of the crank shaft.

2. In an apparatus for churning cream, whipping eggs, cream, salad dressings and similar uses, a variable driving mechanism comprising a base, a frame united to the base extending upwardly therefrom, concentric drive shafts mounted upon the base and frame one within the other with one end extended, a crankshaft mounted in the frame at right angles to the drive shafts, a friction disc mounted upon the crankshaft, friction wheels adjustably mounted respectively upon the inner and outer drive shafts to bear against the friction disc on opposite sides of the crankshaft, and separate and independent means to change the relative spacing of the friction wheels from the axis of the crank shaft and secure them in fixed spaced position on the drive shafts respectively at different distances from the crankshaft.

3. In an apparatus for churning or whipping cream and similar uses, an adjustable driving mechanism comprising a base, a frame united to the base extending upwardly therefrom, concentric drive shafts mounted upon the base and frame, one within the other, and having one end extended beyond the frame, a crankshaft mounted in the frame at right angles to the drive shafts, a friction disc mounted upon the crankshaft, friction wheels mounted respectively upon the inner and outer drive shafts to bear against the friction disc on opposite sides of the crankshaft, said friction wheels being manually adjustable separately and independently of each other upon their respective shafts, and means to secure the friction wheels in adjusted fixed positions upon their drive shafts either at the same or at different distances from the crankshaft whereby the drive shafts may be rotated in opposite directions and either at the same or at different speeds.

WILLIAM F. STEWART.